United States Patent [19]
Deysson et al.
[11] Patent Number: 4,859,121
[45] Date of Patent: Aug. 22, 1989

[54] METHOD AND DEVICE FOR THE DISPERSION OF ULTRA-FINE POWDERS

[75] Inventors: Jean-Yves Deysson, Paris; Jacques Karian, Dampierre; Philippe Malgrat, Vaucresson; Michel Blondeau, Plaisir, all of France

[73] Assignee: Bertin & Cie, Plaisir Cedex, France

[21] Appl. No.: 256,191

[22] Filed: Oct. 11, 1988

Related U.S. Application Data

[63] Continuation of Ser. No. 932,512, Nov. 4, 1986, abandoned.

[30] Foreign Application Priority Data

Mar. 5, 1985 [FR] France ............................ 85 03196

[51] Int. Cl.[4] ............................................ B65G 53/40
[52] U.S. Cl. .................................. 406/114; 406/136; 406/76; 222/389
[58] Field of Search .............................. 406/114–116, 406/76, 136; 222/389; 239/310, 313, 331, 338

[56] References Cited

U.S. PATENT DOCUMENTS

| | | | |
|---|---|---|---|
| 2,781,154 | 2/1957 | Meredith | 406/136 |
| 3,854,634 | 12/1974 | Hart | 406/136 |
| 4,023,778 | 5/1977 | Joly et al. | 239/310 X |
| 4,497,598 | 2/1985 | Blanton | 406/114 |

FOREIGN PATENT DOCUMENTS

| | | | |
|---|---|---|---|
| 340716 | 12/1977 | Australia . | |
| 874283 | 6/1971 | Canada | 406/114 |
| 1206212 | 1/1986 | U.S.S.R. | 406/114 |
| 1224227 | 4/1986 | U.S.S.R. | 406/136 |

*Primary Examiner*—Joseph F. Peters, Jr.
*Assistant Examiner*—James M. Kannofsky
*Attorney, Agent, or Firm*—A. W. Breiner

[57] ABSTRACT

Method and device for suspending an ultrafine powder in a gas wherein a mass of powder to be dispersed in enclosing in a container between an axially movable piston and an axially fixed member adjacent to the ends of the container. The fixed member defines an inner counteracting surface facing the powder to be dispersed and has a peripheral gas inlet passage adjacent to the wall of the container and an axial passage extending out of a first end of the container. The second end of the container has a gas inlet. A first gas flow is injected into the second end of the container to move the piston towards the fixed member, thereby pressing the powder against the counteracting surface of the fixed member. A second gas flows into the first end of the container through the peripheral passage for eroding the powder adjacent to the counteracting surface and driving the eroded powder through the axial passage out of the container. The process and device can be utilized independent of conditions of orientation, of vibrations, and of external accelerations; yet is simple, light in weight, and inexpensive.

5 Claims, 2 Drawing Sheets

METHOD AND DEVICE FOR THE DISPERSION OF ULTRA-FINE POWDERS

This application is a continuation of application Ser. No. 06/932,512, filed Nov. 4, 1986 now abandoned.

The present invention relates to a process and a device for suspending, in a gas, powders which are ultrafine, that is to say consisting of particles whose size is below one micrometre, particularly with a view to dispersing these powders in the atmosphere.

Numerous types of apparatus which enable particles of a few tens of micrometres to be dispersed are known at the present time; they are, for example, of the type of powder extinguishers, which are generally based on a process of pneumatic fluidization of the material within a storage container at the time of use. However, the finest powders, consisting of particles whose size is close to one micrometre are frequently difficult to fluidize because of the cohesive properties of the particles, which oppose their flow under gravity.

When such powders, which will be described as ultrafine hereinafter, are employed, it has already been proposed to use vibrations and/or impacts, for example in vibrating hoppers, to make their fluidization easier. These solutions result in complicated, heavy and costly mechanisms and, in addition, they are unsuitable in the case where, to make handling easier, the powder is in the form of previously compacted blocks.

Patent US-A-3,854,634, in the name of Robert J. Hart, describes a device for suspending a powder and which comprises a receptable in which the powder is placed and a plate which can slide in the receptacle and rest on the free surface of the powder. A telescopic tube is used to blow a pressurized gas across the plate, and this lifts the latter above the powder. The gas escapes sideways while moving along the upper surface of the powder and entraining a proportion thereof. As a result of the departure of the powder, the plate descends, because the gap between the free surface of the powder and the lower face of the plate remains constant. The rate of removal of the powder may be controlled by conveying a proportion of the gas from the telescopic tube directly onto the upper face of the plate; the pressure difference between the two faces of the plate is thus reduced, and this reduces the gap between the plate and the powder.

This simple device has a disadvantage resulting from the fact that the principal force which causes the plate to move is its weight. The orientation of the device must be such that the plate descends substantially vertically. Furthermore, the device must be protected against major jolts and accelerations, which would clearly disturb its operation; an upward acceleration will produce a displacement of the plate in the same direction and a halt in the suspending of the powder; similarly, a major downward acceleration can cause the apparatus to function as a compactor. A particular consequence of this is that the apparatus of this patent cannot function on board a land or aerial vehicle.

The purpose of the invention is to provide a process for suspending ultrafine powders, which may be used independently of the normal conditions of .orientation, of vibrations and of external accelerations.

It is also the purpose of the invention to provide a device permitting the process to be implemented and which is simple, light in weight and inexpensive.

To obtain these results, the invention provides a process for suspending ultrafine powders in a gas, according to which a mass of powder to be dispersed is enclosed in a cylindrical or prismatic container, the said gas is passed under pressure along a path comprising an entry passage, an exit passage and an intermediate space in which the gas moves from the entry passage towards the exit passage while moving along the free surface of the powder in order to erode it and to entrain the said powder, this intermediate space having a shape and dimensions which are substantially constant by virtue of the fact that a counteracting surface which is approximately parallel to the free surface of the powder moves relative to the mass so as to remain at an approximately constant distance from the free surface while the powder is gradually entrained towards the exit passage, by virtue of the action of a piston which moves in the container under the effect of an external force, the particular feature of this process being that a permanent gas pressure capable of moving the said piston is applied to the said movable piston to create the said relative motion of the counteracting surface relative to the mass of powder.

A consequence of the fact that the force which moves the piston results from a gas pressure is that the process may be employed for any orientation of the container, and whatever the acceleration to which it is subjected.

In theory, a result of this kind could be obtained with mechanical piston entrainment, but it would then be very difficult to obtain a uniform powder suspending action. In fact, any change in the pressure of the gas intended to entrain the powder and which occurs in the intermediate space must entail a change in the speed of travel of the piston. In the case of a mechanical entrainment, a control of this kind would require a complication and costly installation, whereas with the arrangement of the invention, self-regulation takes place because an increase in the pressure in the intermediate space automatically entails a reduction in the force acting on the piston, this force resulting from the pressure difference between the two faces of the piston.

According to a particularly simple embodiment, a container in which the counteracting surface is fixed is used, the powder to be dispersed is placed against one face of the piston, the free surface of the powder being away from the piston and facing the said counteracting surface and, on the face of the piston which is away from the powder, a pressure is exerted which differs from that which is applied on the free surfce by the amount necessary to produce the said movement of the powder in relation to the counteracting surface.

This embodiment corresponds to a device which comprises only one movable component, namely the piston. On the other hand, the result is not absolutely constant while a powder charge is consumed, because the friction of the latter on the wall varies somewhat with time.

If this disadvantage is to be avoided, a second embodiment may be provided, in which a container which comprises a closed fixed bottom is used, the powder to be dispersed is placed between the said fixed bottom and the piston, whose face which is turned towards the powder forms the counteracting surface, and a gas is passed successively along the face of the piston away from the powder and then across a passage which produces a pressure drop, along the face of the piston which is turned towards the powder.

This mode of operation resembles that of the abovementioned patent US-A-3,854,634, but the direction in which the gas passes is reversed. This reversal provides unexpected and major advantages, indicated above, of an insensitivity to the orientation and to accelerations, as well as the possibility of using a very light piston, resulting in a useful weight saving if the process is used on board a vehicle.

The receptacle and the piston may have a cross-section of any shape, but a circular shape is preferable. In this case, whatever the embodiment used, it is advantageous to impart to the piston a rotational motion about its axis. This produces an increased uniformity in the shape of the intermediate space, and also a reduction in the friction of the piston and, possibly, of the mass of powder, against the wall of the receptacle.

In order to exploit the benefits of the insensitivity of the process to orientation to greater advantage, it is advantageous to provide for the mass of powder to be placed in the form of a compact block, prepared beforehand, and this enables the receptacle to be filled in any orientation.

Other individual features and advantages of the invention will become apparent from reading the following description, which relates to practical embodiments, illustrated with the aid of the drawings, among which:

Figure 1:
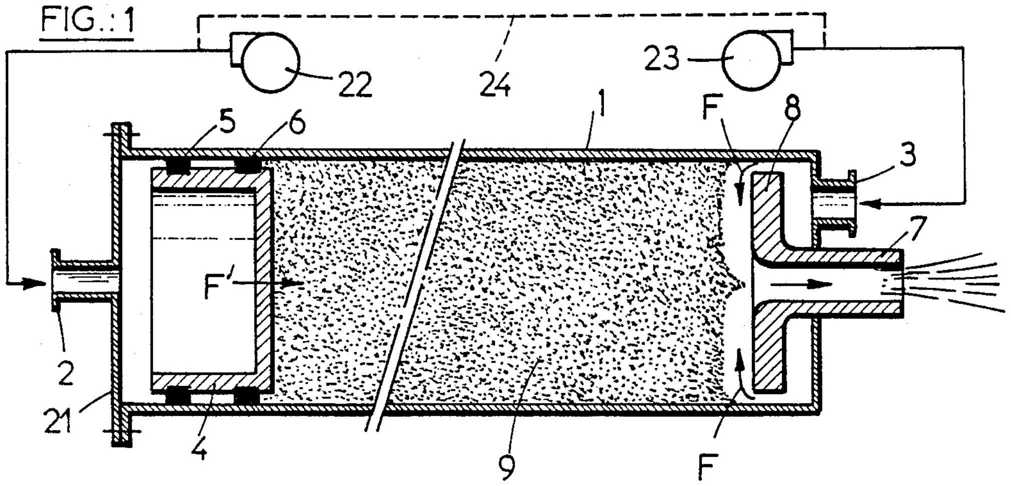
FIG. 1 shows a diagrammatic view in lengthwise section of the suspending device according to the present invention in a first embodiment.

As can be seen in FIG. 1, the suspending device according to the invention, according to a first embodiment, comprises a cylindrical body 1 closed at one end by a cover 21 equipped with a first entry tube 2 which is connected to a source of compressed air 22, and a second entry tube 3, which is connected to a second source of compressed air 23. It shall be noted that, in an alternative form, a single source of compressed air 22 or 23 may be provided, which is connected to both tubes 2 and 3 via a conduit 24, shown as a broken line.

A piston 4 is mounted so as to slide inside the cylinder 1 on the side of the axial tube 2. It is in the shape of a cylindrical dish open towards this tube, while O-ring seals 5 and 6 are inserted between the side wall of the cylinder 4 and the inner face of the cylinder 1.

On the side of the second entry tube 3, an axial nozzle 7 is mounted, which is intended for the discharge of the dispersed product and which passes through the planar front wall of the cylinder 1. Inside this cylinder, the nozzle 7 is extended outwards into a disk 8 which is perpendicular to it and whose periphery is situated at a short distance from the inner face of the cylinder 1.

With the compacted powdery material 9 which is to be dispersed being housed between the piston 4 and the disk 8, the compressed air which enters through the tube 3 into the cylinder 1 flows between the inner face of the cylindrical wall of the latter and the periphery of the disk 8 and, following the path indicated by the arrows F, skims and erodes the free surface of the block of compacted powder 9. This air which has just been charged with extremely fine powder particles passes through the nozzle 7 and is dispersed into the atmosphere.

Simultaneously, the compressed air introduced into the cylinder 1 through the tube 2 pushes the piston 4 in the direction of the arrow F', and this moves the block of compacted powder in proportion with the discharge of the powder to be dispersed, towards the exit nozzle 7.

Figure 2:
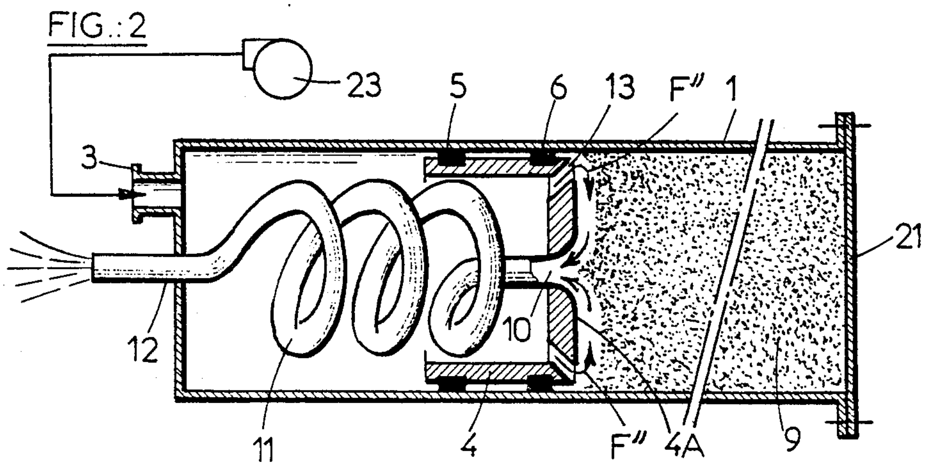
FIG. 2 is similar to FIG. 1, but it shows another embodiment of the device in question.

In FIG. 2, the members which are similar to those in FIG. 1 or which perform the same function have been shown using the same reference numbers. The cylinder 1 and the piston 4 can be seen again, but there is only one compressed air entry nozzle 3 and a single source of compressed air 23. The bottom of the piston 4 has, at its centre, a perforation 10 which is connected to a flexible tube 11, leading to the open air by an axial perforation 12 in the bottom of the cylinder 1, which also comprises the entry tube 3. The piston 4, which in this case is also equipped with seals 5 and 6 which are inserted between its side wall and the inner face of the cylinder 1, comprises a plurality of perforations 13 which are uniformly distributed over the periphery of its flat bottom and which are oriented towards the wall of the cylinder 1, forming an angle in the region of 45 degrees with the generatrices of the latter.

It will readily be understood that, in this embodiment, the compressed air entering the cylinder 1 through the entry tube 3 exerts on the piston 4 a pressure which, despite the pressure drop due to the perforations 13, is sufficient to push it towards the block of compacted powdery material 9 enclosed between the front face 4A of the piston and the bottom of the cylinder 1 away from the tube 3. At the same time, the compressed air which flows through the perforations 13 skims and erodes the surface of the block of compacted material 9 whose particles it entrains towards the arrows "F" towards the flexible tube 11 and, from there, towards the outside air, in which it becomes dispersed.

Figure 3:
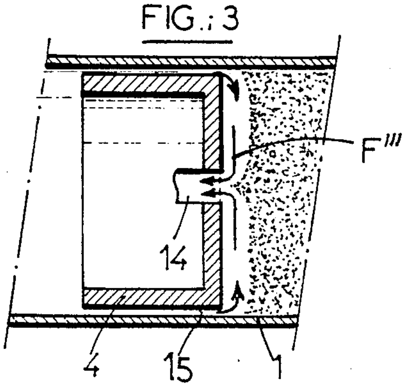
FIG. 3 shows, also in a diagrammatic lengthwise section, the part which is in the vicinity of the piston of the dispersing device according to the invention, in a third embodiment.

In the case of FIG. 3, the seals 5 and 6 of FIG. 2, and the perforations 13 have been omitted and the compressed air arriving from the tube 3 flows through a clearance 15, provided between the cylindrical wall of the piston 4 and the inner face of the cylinder 1, and follows the path shown by the arrows F" and subsequently flows out through a nozzle 14 which is itself connected to a flexible tube which is not shown and which is similar to the tube 11 in FIG. 2.

Figure 4:
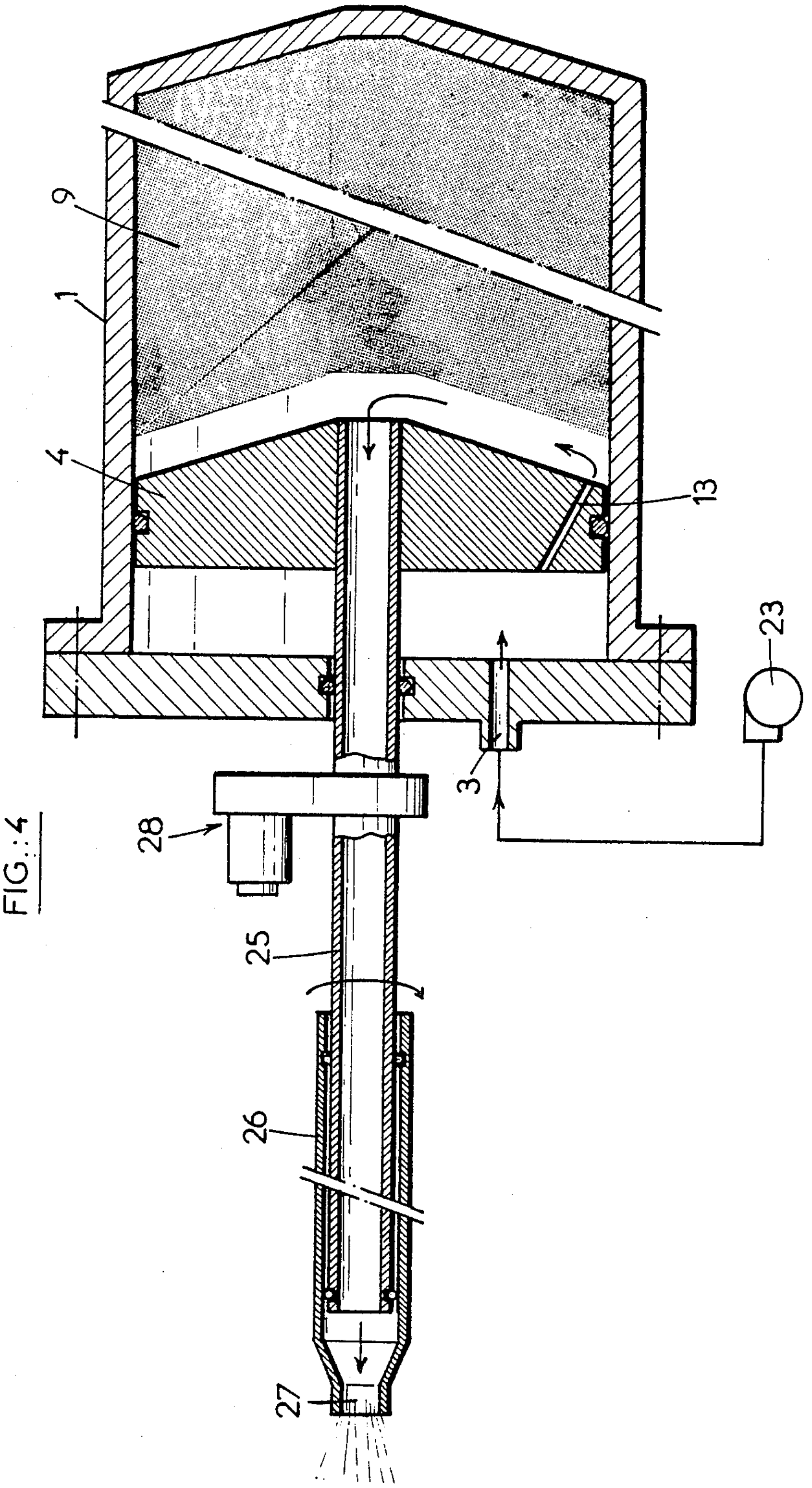
FIG. 4 is similar to FIG. 2, but shows an alternative form of the device.

FIG. 4 shows, collected together in a single device, several alternative forms of that of FIG. 2, it being possible for these alternative forms to be employed separately.

The flexible tube 11 has been replaced by a telescopic tube consisting of a first member 25 fastened integrally to the piston 4 and capable of sliding in a second member 26 provided with an ejection orifice 27.

A reduction drive unit 28 drives the tube member 25 in rotation about its axis, and consequently the piston 4. The latter has only a single perforation 13 which, as a result of the rotation of the piston, produces an erosion of the mass of powder which is at least as uniform as the plurality of perforations in FIG. 2, while reducing the air flow necessary to suspend the powder.

The face of the piston 4 which is turned towards the product has a shape which is convex and, more precisely, frustoconical with an apex angle of approximately 150°. It has been found that convex shapes, and especially the shape described, produce the most uniform results.

It will be noted that the use of a telescopic tube enables the piston to rotate continuously. An alternating rotation can also be envisaged, for example if the tube member 25 is connected to a flexible tube.

The way in which the devices which have just been described operate is obvious and will not be commented upon in greater detail. It will be noted, however, that several methods of recharging the container 1 may be envisaged. Thus, the apparatus may consume the material 9 in the form of blocks of previously compacted powdery materials inserted after removing the cover 21 of the storage container 1, it being possible for this recharging to be accomplished by a single operator in a few seconds.

It will also be noted that during a distribution sequence, the rate of erosion of the powder 9 by the entraining gas must be greater than a threshold value, while the pressure drop in the peripheral perforations 13 (FIG. 2) or the annular slot 15 (FIG. 3) has to be regulated as a function of the flow and of the nature of the material to be dispersed. For this purpose, the circulation of the powder and of the gas inside the container 1 and around the discharge orifice 7 (FIG. 1) or 10 (FIG. 2) must be such that the rate of erosion of the powder always remains greater than this threshold value. In fact, if this condition is not met, preferential paths appear in the mass of the material and, in order to prevent most of the pressurized entraining gas from flowing freely along these paths, which would entail a considerable drop in material flow, it is necessary to destroy these paths continually and at the same time to destroy any particle agglomerates which may form, especially by shear and erosion.

In practice, the distance between the counteracting surface consisting of the disk 8 or of the front face of the piston 4 and the free surface of the powder is of the order of 0.2 to 0.04 mm and the velocity of the powder-charged gas measured at the discharge orifice 7, 10, is between 35 and 300 m/s. The powder flow itself can vary to a very large degree as a result of the pressure regulation and/or of an adjustment of the means of discharge. This flow may thus be varied between a few tens of grams per second and several kilograms per second.

The suspension formed can then be dispersed in the atmosphere at a high velocity, for example, 100 to 340 m/s, for air at 20° C.

We claim:

1. A process for suspending an ultrafine powder in a gas comprising the steps of:

enclosing a mass of powder to be dispersed in a container having first and second ends, said mass being placed between an axially movable piston and an axially fixed member enclosed in said container adjacent to the first and second ends thereof respectively, said fixed member defining an inner counteracting surface facing said powder, having peripheral passage means adjacent to a wall of said container and axial passage means extending out of said container, connecting a first source of pressurized gas to said first end of said container and applying to said movable piston a permanent pressure of the gas from said source, this pressure being such as to move said piston towards said fixed member for any orientation of the container and whatever the acceleration to which it is submitted, thereby pressing said powder against said counteracting surface of said member, injecting a flow of a second gas produced by a second source of pressurized gas, which is independent from said first source of pressurized gas into said second end of said container whereby said gas flows through said peripheral passage means for eroding said powder adjacent to said counteracting surface and driving said eroded powder through said axial passage means out from said container, controlling said flow of second gas to obtain a predetermined velocity of the powder-charged gas, measured at said axial passage means, and a predetermined powder flow, and independently controlling the pressure provided by said first source of pressurized gas to maintain an approximately constant distance from a free surface of the mass of powder to the counteracting surface.

2. Process according to claim 1 comprising the supplementary steps of, at first, controlling said first gas flow for compacting said powder between said piston and member, then admitting said second gas flow and controlling said first gas flow for maintaining said powder adjacent to said counteracting surface.

3. The process as claimed in claim 1, wherein the mass of powder is placed in the form of a compact block prepared in advance.

4. A device for suspending a powder in a gas comprising a container having first and second ends, a counteracting surface at a first end of said container which is axially fixed relative to said first end; a gas entry passage and a gas exit passage at said first end; a piston constructed and arranged to move between said counteracting surface and the second end of said container; a gas inlet at said second end; a source of pressurized gas connected to said gas entry passage at said first end, and means for controlling the flow of gas through said gas entry passage, a second source of pressurized gas, connected to said gas inlet at said second end, and means for independently controlling the pressure of gas at said second end.

5. The device as claimed in claim 4, wherein said exit passage is placed substantially in the center of the counteracting surface, while the entry passage or passages are placed near the periphery of the counteracting surface.

* * * * *